United States Patent Office 3,120,500
Patented Feb. 4, 1964

3,120,500
PROCESS FOR PRODUCING SILICONE RESINS OF CONTROLLED HYDROXYL CONTENT
Dexter P. Huntington, Tonawanda, and Thomas H. Welch, Eggertsville, N.Y., assignors to Union Carbide Corporation, a corporation of New York
No Drawing. Filed July 10, 1961, Ser. No. 122,628
5 Claims. (Cl. 260—46.5)

This invention relates to an improved process for producing silicone (polysiloxane) resins. More particularly, this invention is concerned with an improved process for producing thermosetting silicone resins of controlled hydroxyl content. This application is a continuation-in-part of our co-pending application Serial No. 738,323, filed May 28, 1958, now abandoned.

Thermosetting (heat-hardenable) silicone resins are characterized by a three-dimensional molecular structure of alternating silicon and oxygen atoms, having hydrocarbon and hydroxyl substituents on the silicon atoms. Usually the hydrocarbon radicals are present in average amounts of from about 0.5 to about 1.9 hydrocarbon radicals per silicon atom, and the hydroxyl radicals are present in amounts of from less than about 1 to about 4.0 percent by weight of resin. The application of heat causes condensation (that is, the elimination of water between two SiOH groups with the formation of an SiOSi bond) and the resulting cross-linked (three-dimensional) resin is hard and durable.

The preparation of thermosetting silicone resins is known in the art. These resins are usually prepared by the hydrolysis and controlled condensation of one or more hydrolyzable silanes. However, when silicone resins are prepared in this manner, considerable difficulty is encountered in controlling the reaction in order to obtain a resin having a desired degree of condensation and of hydroxyl content. Thus, if the reaction is allowed to proceed too far, excessive condensation occurs and the resin gels in the reaction vessel; if the reaction is stopped too soon, the resin exhibits poor handling, drying and curing properties.

Accordingly, the principal object of this invention is to provide a new and improved process for preparing thermosetting silicone resins.

A specific object of this invention is to provide an improved process for preparing thermosetting silicone resins which obviates the processing difficulties encountered in prior art techniques of hydrolyzing and condensing a silicone hydrolyzate to a predetermined silanol content. Thus, the present invention provides an improved way for preparing thermosetting silicone resins having a predetermined silanol content which avoids the difficulties involved in stopping a condensation reaction at a point at which the resin has a desired hydroxyl content, said point being hereinafter referred to as the critical end point.

A still further object of this invention is to provide a process for preparing thermosetting silicone resins which yields reproducible resin products of predetermined silanol content. By our process, a greater uniformity in the properties of the resin can be obtained in commercial production thereof.

The term "silanol group" as used herein is understood to mean a silicon-bonded hydroxyl group.

In accordance with this invention, thermosetting silicone resins of controlled silanol content are prepared by a three-stage process comprising: (1) hydrolysis and condensation of one or more hydrolyzable silanes to a partially condensed hydroxyl-containing silicone hydrolyzate, (2) further condensation of said hydrolyzate in the presence of sodium hydroxide catalyst to a relatively silanol-free (less than about 0.25 weight percent silanol groups) polymer, and (3) reintroduction of controlled amounts of silanol groups into the structure of said polymer by heating a neutral solution of the polymer with water under pressure in order to hydrolytically cleave the Si—O—Si bonds of the polymer to form Si—OH bonds while controlling the conditions of the reaction so that at equilibrium a resin of predetermined silanol content is obtained. The silanol content is "predetermined" in that at equilibrium the resin contains between about 0.25 and about 4.0 weight percent silicon-bonded hydroxyl groups. Our process of preparing silicone resins represents a considerable improvement over conventional prior art processes inasmuch as the third and last stage of our process can be allowed to proceed to a point of equilibrium. Thus, by carefully selecting the concentration of reactants and the conditions at which they are reacted, it is possible to obtain a resin of predetermined silanol content without stopping the reaction at a critical end point.

The term "hydrolysis" is understood to mean the reaction of water with a silane to replace a silicon-bonded halogen, hydrogen or hydrocarbonoxy group with a hydroxyl group. The term "condensation" is understood to mean the elimination of water between two SiOH groups with the formation of an SiOSi bond. The term "partially condensed" means that the siloxane hydrolyzate contains both SiOSi bonds and SiOH groups.

The starting materials employed in our process are the organo-substituted hydrolyzable silanes, preferably silanes in which the non-hydrolyzable groups are monovalent hydrocarbon radicals. However, limited amounts of hydrolyzable silanes containing no organic groups, such as silicon tetrachloride, or trichlorosilane, may also be employed.

The hydrolyzable silanes employed are preferably chlorosilanes, since they are cheaper and more readily available. However, other hydrolyzable silanes, such as alkoxy silanes, may also be employed as starting materials.

Although we prefer to employ methyl-, phenyl-, and methylphenyl-substituted hydrolyzable silanes as starting materials, it will be obvious to those skilled in the art that the starting silanes may contain hydrocarbon radicals other than methyl and phenyl, such as ethyl, propyl, tolyl, xylyl, benzyl, phenylethyl, naphthyl and the like, as well as substituted hydrocrabon radicals, such as halo-substituted hydrocarbon radicals, amino-substituted hydrocarbon radicals, cyano-substituted hydrocarbon radicals and the like. However, the preferred starting materials are the methyl-, phenyl-, and methylphenylchlorosilanes, such as methyltrichlorosilane, phenyltrichlorosilane, dimethyldichlorosilane, diphenyldichlorosilane, methylphenyldichlorosilane and the like.

By suitably selecting and proportioning the starting materials, it is possible to control the ratio of organic radicals to silicon atoms (R:Si ratio) in the final product. The preferred R:Si ratio will differ depending upon the particular types of organic radicals incorporated into the resin. In general, for the resins produced by the process of this invention the ratio may vary from as low as 0.5:1.0 to as high as 1.7:1.0. When a silicone resin containing only methyl and phenyl radicals is desired, the ratio of R:Si should be maintained between approximately 1.1:1.0 and 1.7:1.0 in order to impart optimum properties to the resin.

The first step of our process comprises hydrolyzing and condensing one or more hydrolyzable silanes to a partially condensed hydroxyl-containing silicone hydrolyzate by any of the various techniques known in the art. However, whereas careful controls must be applied when employing these prior art techniques in order to stop the reaction at a critical end point and thereby produce a resin having a desired hydroxyl content, according to the process of our invention the reaction is allowed to proceed with no special care being taken to carry the reaction to a critical end point.

Although various techniques may be employed to prepare a partially condensed hydroxyl-containing silicone hydrolyzate, we prefer to employ either of two well-known hydrolysis techniques commonly employed in the art, namely, either the "limited water" or "excess water" technique. In both of these techniques sufficient water is employed to hydrolyze all the hydrolyzable groups present in the silane mixture. In the "limited water" technique not more than about a 10 percent excess of water (over that required for complete hydrolysis) is employed. In the "excess water" technique more than about a 10 percent excess of water is employed, and preferably enough excess water to reduce the maximum HCl concentration in the aqueous phase of the hydrolysis mixture to not greater than 28 weight percent.

When employing the "excess water" technique, a mixture of hydrolyzable silanes, preferably chlorosilanes, in suitable proportion, is added to an agitated mixture of water and a solvent in which the hydrolyzate is soluble, such as isopropyl ether. The overall reaction is exothermic, and when lower boiling solvents are employed, the reaction system is preferably cooled to prevent loss of solvent and solvent-entrained monomers by boiling. For example, when isopropyl ether is employed as solvent, the temperature is preferably maintained below 52° C.

After the addition of the silanes and the hydrolysis reaction is completed, the mixture is allowed to settle into two phases. When the silanes employed are chlorosilanes, and isopropyl ether is employed as solvent, the upper phase will contain a solution of silicone hydrolyzate in isopropyl ether, while the lower phase will contain a solution of HCl in water. In such case, isopropyl ether is preferably employed in an amount calculated to give a maximum theoretical resin solids (resin solids obtained on fully condensing the resin) concentration in solution at the completion of hydrolysis of about 31 weight percent, and water is preferably employed in an amount calculated to give a maximum concentration of HCl in solution at the completion of hydrolysis of about 28 weight percent. Higher concentrations of HCl may result in gelation of the silicone resin, while at higher concentrations than approximately 31 weight percent theoretical resin solids in the solvent, the specific gravity of the isopropyl ether solution approximates that of water, causing extremely slow separation of the two phases after hydrolysis and during subsequent washings with water.

When employing the "limited water" technique, a mixture of hydrolyzable silanes, preferably chlorosilanes, in suitable proportion, are dissolved in a suitable solvent, such as isopropyl ether, and the resulting solution agitated while water is added. As the reaction is endothermic under these conditions, the temperature is preferably maintained between approximately 25° C. and 35° C. by heating. When isopropyl ether is employed as solvent, it is preferably employed in an amount calculated to give a maximum theoretical resin solids concentration in solution at the completion of hydrolysis of about 45 weight percent. Water is then added in an amount up to about 10 percent excess over the stoichiometric amount required for complete hydrolysis of the silanes. After the addition of water is complete, additional isopropyl ether is added in an amount calculated to give about a 31 weight percent maximum theoretical resin solids concentration in solution, the maximum solids concentration which permits easy washings with water.

While we prefer to employ isopropyl ether as solvent in the first stage of our process, in general, the solvent employed is not critical, and any inert solvent can be advantageously employed. By an inert solvent we mean a solvent which is non-reactive with the silicone hydrolyzate. For example, ethers, such as isopropyl ether, ethyl ether and the like, esters, such as butyl acetate, ethyl acetate and the like, ketones, such as dimethylketone, diethylketone and the like, aliphatic hydrocarbons, such as petroleum ether, hexane, heptane, octane, decane, and mixtures of such aliphatic hydrocarbons, aromatic hydrocarbons, such as benzene, toluene and the like, and various mixtures thereof can be advantageously employed.

In order to insure consistent, reproducible results, it is necessary to neutralize the hydrolyzate before proceeding to the second stage of our process. Thus, whenever the silicone hydrolyzate has been prepared by the hydrolysis of chlorosilanes, it is necessary to remove residual HCl. This may usually be accomplished by washing the solvent phase with water until the washings are acid free. The sodium hydroxide employed as catalyst in the second stage of our process may also be used to neutralize residual HCl.

If desired, the solution may be stripped of solvent and the remaining hydrolyzate resolvated in another solvent for use in the second stage of our process. In the case of isopropyl ether, stripping may be accomplished by heating the solution at about 130° C. If the solvent employed in the first stage of our process is also suitable for use in the second stage, stripping is unnecessary.

The second stage of our process comprises further condensing a partially condensed hydroxyl-containing silicone hydrolyzate prepared in accordance with stage one of our process to a relatively silanol-free polymer by heating a solution of said hydrolyzate with sodium hydroxide as catalyst. For convenience, we have termed the resulting polymers "dead resins," because of their relative freedom from reactive silanol groups. However, infra-red analysis indicate that these resins are not completely condensed, but retain approximately 0.25 weight percent, or less, hydroxyl content.

An important feature of this stage is that the condensation reaction is carried essentially to completion rather than being terminated at a critical end point. The time required to drive the condensation reaction to completion will vary with the system, being related to such variables as temperature, pressure, nature and concentration of the solvent, and the nature of the resin employed. We have found the condensation time to be generally less than four hours. In any event, the condensation time can be determined empirically by evaluating resins prepared from condensations arrested at differing time intervals.

Thus, when condensation is effected under conditions where the water eliminated in the condensation reaction is not removed from the reaction system, such as when condensation is effected under pressure in an autoclave, the reaction is allowed to continue until condensation is complete, as empirically predetermined. However, where condensation is effected under conditions which allow for removal of eliminated water from the reaction system, such as when condensation is effected at the boiling temperature of the solvent under atmospheric conditions, the azeotropic distillate may be collected in a suitable apparatus, such as a Dean-Starke trap, and the reaction allowed to continue until water is no longer present in the azeotropic distillate, at which time condensation is presumed to be complete.

The catalyst used to effect condensation of a partially condensed hydroxyl-containing silicone hydrolyzate to a relatively silanol-free resin according to the second stage of our process is sodium hydroxide. The catalyst must be employed in an amount sufficient to impart a minimum pH of approximately 8 to the resin solution. Preferably, the pH is maintained between about 8 and 9, although any pH above 8 may be employed.

In order to effect condensation of a partially condensed hydroxyl-containing silicone hydrolyzate to a relatively silanol-free resin according to the second stage of our process, the use of a solvent is necessary. In general, the solvent employed is not critical, and any inert solvent can be advantageously employed. By an inert solvent we mean a solvent which is non-reactive with the silicone hydrolyzate and catalyst. For example, ethers, such as isopropyl ether, ethyl ether and the like, esters, such as butyl acetate, ethyl acetate and the like, aliphatic hydrocarbons, such as petroleum ether, hexane, heptane, octane and mixtures of such aliphatic hydrocarbons, aromatic hydrocarbons, such as benzene, toluene and the like, and various mixtures thereof can be advantageously employed.

Thus, it will be apparent to those skilled in the art, that various solvents commonly used in the first stage of our process may also be advantageously employed in the second stage of our process. Indeed, by a suitable selection of solvent, it is possible to employ a single solvent in all three stages of our process, as well as in the application of the final resin. Thus, the need for solvent exchanging prior to the various stages of our process, and prior to the application of the final resin, may be eliminated by employing such solvents as toluene, xylene and the like, throughout our entire process.

The amount of solvent employed in the second stage of our process depends to a large extent upon the particular solvent used and the nature of the hydrolyzate. For example, the amount of solvent employed depends largely on the R:Si ratio of the hydrolyzate. In general, the lower the ratio of hydrocarbon radicals to silicon atoms in the hydrolyzate, the greater the amount of solvent necessary to prevent gelation of the hydrolyzate. As the ratio of hydrocarbon radicals to silicon atoms in the hydrolyzate increases, lesser amounts of solvent are required to prevent gelation. A hydrolyzate having a ratio of hydrocarbon radicals to silicon atoms of 1.5:1.0 can be satisfactorily condensed to a relatively silanol-free resin in toluene at a theoretical resin solids concentration of 37.5 weight percent or less; however, attempts to condense the same hydrolyzate to a silanol-free resin at a concentration of 39.0 weight percent theoretical resin solids in toluene resulted in gelation of the solution.

The temperature at which condensation of a partially condensed hydroxyl-containing silicone hydrolyzate to a relatively silanol-free resin can be effected according to the second stage of our process is not narrowly critical, and may vary widely. In general, temperatures from as low as 45° C. to as high as 190° C. can be advantageously employed. Preferably, condensation is effected at the boiling point of the solvent under atmospheric conditions. Condensation may also be effected at temperatures above and below the boiling point of the solvent, as well as above and below the broadly disclosed range; however, no commensurate advantage is obtained thereby.

The pressure at which condensation of a partially condensed hydrdoxyl-containing silicone hydrolyzate to a relatively silanol-free resin (polymer) can be effected according to the second stage of our process is not narrowly critical, and may vary widely. As a practical matter, it is preferable to employ atmospheric pressure. Pressure both above and below atmospheric pressure may be advantageously employed; however, no commensurate advantage is obtained thereby.

After reaction is complete, the solution must be neutralized before proceeding to the third stage of our process. Neutralization may be accomplished by adding hydrochloric acid or trimethylchlorosilane to the solution until slight acidity develops, and then adding a weak base, such as propylene oxide, until the solution is completely neutral. After neutralization,, the solution is no longer susceptible to gelation, and the solids content may be increased to any desired value by stripping off solvent.

The third stage of our process comprises heating a solution of a relatively silanol-free polymer (resin) prepared in accordance with stage two of our process under increased pressure in the presence of water in order to reintroduce silanol groups in controlled amounts into the structure of said resin by hydrolytically cleaving the Si—O—Si bonds of said resin to form Si—OH bonds.

An important feature of this stage is that the reaction may be allowed to continue until equilibrium has been attained, thus obviating the need for a critical end point. The time required to attain equilibrium, as well as the silanol content of the resin at equilibrium, will vary with the system, being related to such variables as temperature, pressure, nature and concentration of solvent, nature of the resin employed, and the amount of water employed. The time required to attain equilibrium under a given set of conditions is generally less than twelve hours, and may be determined empirically by evaluating resins prepared by arresting the reaction at differing time intervals.

In order to reintroduce silanol groups into a relatively silanol-free resin according to the third stage of our process, the use of a solvent is necessary. Although the silanol content of the resin at equilibrium will vary with the solvent employed, in general, the solvent employed is not critical, and any inert solvent can be advantageously employed. By an inert solvent we mean a solvent which is non-reactive with the silicone polymer. For example, ethers, such as isopropyl ether, ethyl ether and the like, esters, such as butyl acetate, ethyl acetate and the like, ketones, such as dimethylketone, diethylketone and the like, aliphatic hydrocarbons, such as petroleum ether, hexane, heptane, octane, decane and mixtures of such aliphatic hydrocarbons, aromatic hydrocarbons, such as benzene, toluene and the like, and various mixtures thereof can be advantageously employed.

Thus, it will be apparent to those skilled in the art, that various solvents commonly used in the first two stages of our process may also be advantageously employed in the third stage of our process. Indeed, by a suitable selection of solvent, it is possible to employ a single solvent in all three stages of our process, as well as in the application of the final resin. Thus, the need for solvent exchanging prior to the various stages of our process, and prior to the application of the final resin, may be eliminated by employing such solvents as toluene, xylene and the like, throughout our entire process.

The amount of solvent employed in the third stage of our process depends to a large extent upon the particular solvent used and the results desired. For example, when toluene is employed as solvent, as is preferred, it can be advantageously employed in amounts calculated to give concentrations of resin solids in solution ranging from about 40 weight percent to about 86 weight percent. Concentrations of resin solids both greater and less than the disclosed range can also be employed; however, no commensurate advantage is obtained thereby.

In order to reintroduce silanol groups into a relatively silanol-free polymer according to the third stage of our process, both heat and pressure are necessasry. While the temperature and pressure employed depend to a large extent on the other reaction conditions and the results desired, a minimum temperature of about 250° C. and a minimum pressure of about 400 p.s.i. are generally necessary for satisfactory results. Usually temperatures above 400° C., and pressures about 20,000 p.s.i., are unnecessary, and preferably temperatures of from 260° C. to 280° C., and pressures of from 700 p.s.i. to 1500 p.s.i. are employed.

It will be obvious to those skilled in the art that while temperature and pressure may be separately controlled by effecting reaction in a continuous reactor, when reaction is effected in a sealed pressure vessel, such as an autoclave, temperature and pressure are interrelated, with increased temperature causing increased pressure.

The amount of water employed in the third stage of our process depends to a large extent upon the results desired. Generally, an amount of water ranging from about one-eleventh to about one-fourth of the weight of polymer present, preferably from about one-tenth to about one-eighth of the weight of polymer present, can be advantageously employed. Most preferably, water is employed in an amount of about one-tenth of the weight of polymer present.

After equilibrium has been attained, unreacted water may be removed by distilling the mixture until no more water is present in the azeotropic distillate. If desired, the solvent may be stripped and the resin resolvated in another solvent prior to application.

The silicone resins prepared in accordance with our process are useful as electrical insulating resins. They may be applied in solution with a suitable curing catalyst by such techniques as dipping, spraying and brushing. Curing and solvent removal are then effected by heating. Any solvent well known in the art for applying thermosetting silicone resins may be employed in applying the resin, such as toluene, xylene, cyclohexane, octane and the like. Curing may be effected by the use of curing catalysts well known in the art, such as the octasols and naphthenates of cobalt, zinc, lead and the like, and similar salts.

Silicone resins prepared according to our process exhibit improved properties over silicone resins prepared by previous methods, including faster drying times, improved moisture resistance, and increased thermal stability. Although all the resins produced by the process of this invention have generally useful properties as electrical insulators and heat resistant materials, these resins possess optimum thermal, electrical and cure properties when the reaction conditions are so chosen as to yield a final resin having a silicon-bonded hydroxyl content of from about 0.25 to about 3.0 weight percent, preferably from about 1.3 to about 2.0 weight percent.

It will be apparent to one skilled in the art that certain variations and modifications in the above description may be effected without departing from the spirit of the present invention. The following examples of our invention are set forth for purposes of illustration so that those skilled in the art may better understand the invention, and it should be understood that they are not to be construed as limiting the invention. The dielectric strength set forth in the examples were determined in accordance with ASTM test D–1346–56T.

EXAMPLE I

*Preparation of a Silanol-Free Silicone Resin*

A silane charge having the following composition: dimethyldichlorosilane, 232 grams; diphenyldichlorosilane, 50.5 grams; methyltrichlorosilane, 89.5 grams; phenyltrichlorosilane, 296 grams (R:Si ratio of 1.50:1.0; phenyl:methyl ratio of 0.43:1.0) was hydrolyzed according to the "excess water" technique by adding said charge to a mixture of 1200 ml. of isopropyl ether and 1200 ml. of water, with the temperature being maintained below 52° C. On completion of the hydrolysis reaction, the hydrolyzate-containing ether phase was then separated from the aqueous-HCl phase. The ether phase was washed three times with 300 ml. portions of water to neutrality (about pH of 7) and then stripped of solvent by heating to 130° C. 817 grams of toluene were then added to the hydrolyzate to yield a 30 weight percent solution of resin solids.

To the hydrolyzate solution were added 0.66 gram of 25 weight percent aqueous NaOH solution. The solution was stirred at room temperature for 16 hours, and then heated at its boiling point (105–110° C.) for 6 more hours. During this time, 11.5 ml. of water were removed from the system by distillation. The resulting clear solution was neutralized with trimethylchlorosilane, and stripped of toluene to a resin solution having the following properties:

Solids content _____ weight percent __ 49.6
Viscosity, 25° C _____ cps __ 11
OH content of resin _____ weight percent __ 0.26

A sample resin solution catalyzed with 0.1 weight percent cobalt (as cobalt octasol) and 0.15 weight percent 8-hydroxyquinoline of resin solids failed to dry or cure after heating for 5 hours at 200° C.

EXAMPLE II

*Autoclave Hydroxylation of a Relatively Silanol-Free Silicone Resin*

To a 300 ml. autoclave reactor were charged 160 grams of a resin solution prepared by the method of Example I and 15 grams of water. The bomb was sealed and heated at 275° C. (pressure: 950 p.s.i.g.) for 6 hours. Following this, the bomb was drained and excess water removed from the mixture by first centrifuging, and then refluxing the solution for 3 hours. The resulting resin solution had the following properties:

Solids content _____ weight percent __ 49.5
Viscosity, 25° C _____ cps __ 6.5
OH content of resin _____ weight percent __ 1.4

A sample resin solution catalyzed with 0.1 weight percent cobalt (as cobalt octasol) and 0.15 weight percent 8-hydroxyquinoline of resin solids dried tack-free after heating for 2 hours at 200° C. At 150° C., the sample dried tack-free in less than 6 hours.

EXAMPLE III

*Autoclave Hydoxylation of a Relatively Silanol-Free Silicone Resin*

A relatively silanol-free resin solution prepared by the method of Example I was stripped of toluene to 79.5 weight percent solids content. The solution had a viscosity of 325 cps. at 25° C. 15 grams of water and 100.6 grams of resin solution were then charged to a 300 ml. autoclave reactor and treated in a manner similar to that of Example II for 12 hours. After removal of excess water, toluene was added until a resin solution having the following properties was obtained:

Solids content _____ weight percent __ 68.0
Viscosity, 25° C _____ cps __ 60
OH content of resin _____ weight percent __ 1.4

An uncatalyzed sample of resin solution dried tack-free after heating for 5 hours at 200° C.; a sample catalyzed with 0.04 weight percent cobalt (as cobalt octasol) and 0.06 weight percent 8-hydroxyquinoline of resin solids dried tack-free after heating for 1 hour at 150° C. A glass tape of 8 to 8.5 mils thickness on which the last mentioned catalyzed resin solution was impregnated and cured retained a dielectric strength greater than 1,000 volts/ml. on both straight and bent sections of tape after aging 28 days at 275° C. The catalyzed resin solution had a shelf life at 50° C. of 14 days.

EXAMPLE IV

*Autoclave Hydroxylation of a Relatively Silanol-Free Silicone Resin*

A relatively silanol-free resin solution prepared by the method of Example I was stripped of toluene to 82.5 weight percent solids content. The solution had a viscosity of 400 cps. at 25° C. 15 grams of water and 97 grams of resin solution were then charged to a 300 ml. autoclave reactor and treated in a manner similar to that of Example II for 12 hours. After removal of excess water, toluene was added until a resin solution having the following properties was obtained:

Solids content _____ weight percent __ 70
Viscosity, 25° C _____ cps __ 62
OH content of resin _____ weight percent __ 1.78

A sample resin solution catalyzed with 0.08 weight percent cobalt (as cobalt octasol) and 0.12 weight percent 8-hydroxyquinoline of resin solids dried tack-free after heating for 3 hours at 150° C. A glass tape of 8 to 8.5 mils thickness on which the catalyzed silicone resin solution was impregnated and cured retained a dielectric strength greater than 1,000 volts/ml. on both straight and bent sections of tape after aging 21 days at 275° C.

EXAMPLE V

*Continuous Reactor Hydroxylation of a Relatively Silanol-Free Silicone Resin*

3000 grams of a resin solution prepared by the method of Example I and 400 grams of water were charged at a rate of 1 gallon per hour to a continuous reactor maintained at a temperature of 355° C. and a pressure of 4000 p.s.i. The contact time was 3½ minutes. The product was collceted and water and some toluene were removed by distillation. The resulting resin solution had the following properties:

Solids content_____weight percent__ 68.8
Viscosity, 25° C_____cps__ 42
OH content of resin_____ weight percent__ 1.85

A sample resin solution catalyzed with 0.1 weight percent cobalt (as cobalt octasol) and 0.15 weight percent 8-hydroxyquinoline of resin solids dried tack-free after heating for 3 hours at 150° C. A glass tape of 8 to 8.5 mils thickness on which the catalyzed resin solution was impregnated and cured retained a dielectric strength greater than 1,000 volts/ml. on both straight and bent sections of the tape after aging 7 days at 275° C. The catalyzed resin solution had a shelf life at 50° C. of 32 days.

What is claimed is:

1. The method for preparing a silicone resin of a predetermined silicon-bonded hydroxyl content which comprises hydrolyzing and condensing at least one silane having monovalent hydrocarbon and readily-hydrolyzable radicals attached to the silicon atom thereof to a partially condensed hydroxyl-containing silicone hydrolyzate containing a ratio of monovalent hydrocarobn radicals to silicon atoms of from about 0.05:1.0 to about 1.7:1.0, sufficient water being employed in the hydrolysis to hydrolyze all the readily-hydrolyzable radicals, further condensing said hydrolyzate to a polymer relatively free of silicon-bonded hydroxyl groups by heating a solution of said hydrolyzate in an inert solvent with sodium hydroxide catalyst to a point where no further condensation occurs, said sodium hydroxide catalyst being present in an amount to impart a minimum pH of approximately 8 to the solution, neutralizing said polymer solution, and heating a neutral solution of said polymer in an inert solvent in the presence of water, said water being present in an amount of from about one-eleventh to about one-fourth of the weight of polymer present, to a temperature of from at least about 250° C. to about 400° C. under a pressure of from at least about 400 p.s.i. to about 20,000 p.s.i., in order to reintroduce silicon-bonded hydroxyl groups into the structure of said polymer relatively free of silicon-bonded hydroxyl groups, said heating being continued until equilibrium has been attained.

2. The method for preparing a silicone resin of a predetermined silicon-bonded hydroxyl content which comprises hydrolyzing and condensing at least one silane having monovalent hydrocarbon and readily-hydrolyzable radicals attached to the silicon atom thereof to a partially condensed hydroxyl-containing silicone hydrolyzate containing a ration of monovalent hydrocarbon radicals to silicon atoms of from about 1.0:1.0 to about 1.7:1.0, said hydrocarbon radicals consisting of only phenyl and methyl, sufficient water being employed in the hydrolysis to hydrolyze all the readily-hydrolyzable radicals, further condensing said hydrolyzate to a polymer relatively free of silicon-bonded hydroxyl groups by heating a solution of said hydrolyzate in an inert solvent with sodium hydroxide catalyst to a point where no further condensation occurs, said sodium hydroxide catalyst being present in an amount to impart a minimum pH of approximately 8 to the solution, neutralizing said polymer solution, and heating a neutral solution of said polymer in an inert solvent in the presence of water, said water being present in an amount of from about one-eleventh to about one-fourth of the weight of polymer present, to a temperature of from at least about 250° C. to about 400° C. under a pressure of from at least about 400 p.s.i. to about 20,000 p.s.i., in order to reintroduce silicon-bonded hydroxyl groups into the structure of said polymer relatively free of silicon-bonded hydroxyl groups, and heating being continued until equilibrium has been attained.

3. The method for preparing a silicone resin of a predetermined silicon-bonded hydroxyl content which comprises hydrolyzing and condensing at least one silane having monovalent hydrocarbon and chlorine radicals attached to the silicon atom thereof to a partially condensed hydroxyl-containing silicone hydrolyzate containing a ratio of monovalent hydrocarbon radicals to silicon atoms of from about 1.0:1.0 to about 1.7:1.0, sufficient water being employed in the hydrolysis to hydrolyze all the chlorine radicals, neutralizing said hydrolyzate, further condensing said hydrolyzate to a polymer relatively free of silicon-bonded hydroxyl groups by heating at a temperature between about 45° C. and about 190° C. a solution of said hydrolyzate in an inert solvent with sodium hydroxide catalyst to a point where no further condensation occurs, said sodium hydroxide catalyst being present in an amount to impart a pH of between about 8 and 9 to the solution, neutralizing said polymer solution, and heating a neutral solution of said polymer in an inert solvent in the presence of water, said water being present in an amount of from about one-eleventh to about one-fourth of the weight of polymer present, to a temperature of from at least about 250° C. to about 400° C. under a pressure of from at least about 400 p.s.i. to about 20,000 p.s.i., in order to reintroduce silicon-bonded hydroxyl groups into the structure of said polymer relatively free of silicon-bonded hydroxyl groups, said heating being continued until equilibrium has been attained.

4. The method for preparing a silicone resin of a predetermined silicon-bonded hydroxyl content which comprises hydrolyzing and condensing at least one silane having monovalent hydrocarbon and chlorine radicals attached to the silicon atom thereof to a partially condensed hydroxyl-containing silicone hydrolyzate containing a ratio of monovalent hydrocarbon radicals to silicon atoms of from about 1.0:1.0 to about 1.7:1.0, said hydrocarbon radicals consisting of only methyl and phenyl, sufficient water being employed in the hydrolysis to hydrolyze all the chlorine radicals, neutralizing said hydrolyzate, further condensing said hydrolyzate to a polymer relatively free of silicon-bonded hydroxyl groups by heating at a temperature between about 45° C. and about 190° C. a solution of said hydrolyzate in an inert solvent with sodium hydroxide catalyst to a point where no further condensation occurs, said sodium hydroxide catalyst being present in an amount to impart a pH of between about 8 and 9 to the solution, neutralizing said polymer solution, and heating a neutral solution of said polymer in an inert solvent in the presence of water, said water being present in an amount of from about one-eleventh to about one-fourth of the weight of polymer present, to a temperature of from at least about 250° C. to about 400° C. under a pressure between about 400 p.s.i. to about 1500 p.s.i. in order to reintroduce silicon-bonded hydroxyl groups into the structure of said polymer relatively free of silicon-bonded hydroxyl groups, said heating being continued until equilibrium has been attained.

5. The method for preparing a silicone resin of a predetermined silicon-bonded hydroxyl content which comprises hydrolyzing and condensing a mixture of dimethyldichlorosilane, diphenyldichlorosilane, methyltrichlorosilane and phenyltrichlorosilane, said mixture having a hydrocarbon group to silicon ratio of about 1.50:1.0 and a phenyl group to methyl group ratio of about 0.43:1.0, to a partially condensed hydroxyl-containing silicone hydrolyzate, sufficient water being employed in the hydrolysis to hydrolyze all the chlorine radicals present in said mixture, further condensing said hydrolyzate to a polymer relatively free of silicon-bonded hydroxyl groups by heating at a temperature between about 45° C. and about 190° C. a solution of said hydrolyzate in an inert solvent with sodium hydroxide catalyst to a point where no further condensation occurs, said sodium hydroxide catalyst being present in an amount to impart a pH of between about 8 and 9 to the solution, neutralizing said polymer solution, and heating a neutral solution of said polymer in an inert solvent in the presence of water, said water being present in an amount of from about one-eleventh to about one-fourth of the weight of polymer present, to a temperature of from at least about 250° C. to about 400° C. under a pressure between about 400 p.s.i. to about 1500 p.s.i. in order to reintroduce silicon-bonded hydroxyl groups into the structure of said polymer relatively free of silicon-bonded hydroxyl groups, said heating being continued until equilibrium has been attained.

References Cited in the file of this patent

UNITED STATES PATENTS

| | | |
|---|---|---|
| 2,410,346 | Hyde | Oct. 29, 1946 |
| 2,482,276 | Hyde et al. | Sept. 20, 1949 |
| 2,483,209 | Lamoreaux | Sept. 21, 1949 |
| 2,489,138 | Hyde et al. | Nov. 22, 1949 |
| 2,507,200 | Elliott et al. | May 9, 1950 |
| 2,521,674 | Britton et al. | Sept. 12, 1950 |
| 2,542,334 | Hyde | Feb. 20, 1951 |
| 2,568,384 | Cheronis | Sept. 18, 1951 |
| 2,679,495 | Bunnell | May 25, 1954 |